United States Patent
Tu et al.

(10) Patent No.: US 6,915,145 B2
(45) Date of Patent: Jul. 5, 2005

(54) SELF-RECHARGEABLE PORTABLE TELEPHONE

(75) Inventors: Yu-Ta Tu, Hsinchu Hsien (TW); Show-Jong Yeh, Hemet, CA (US)

(73) Assignee: Sunyen Co., Ltd., Taipei (TW)

( * ) Notice: Subject to any disclaimer, the term of this patent is extended or adjusted under 35 U.S.C. 154(b) by 292 days.

(21) Appl. No.: 10/170,717

(22) Filed: Jun. 14, 2002

(65) Prior Publication Data

US 2003/0228889 A1 Dec. 11, 2003

(30) Foreign Application Priority Data

Jun. 7, 2002 (TW) .......................................... 91112293 A

(51) Int. Cl.$^7$ ................................................. H04B 1/38
(52) U.S. Cl. ..................... 455/573; 455/574; 455/550.1
(58) Field of Search ................................ 455/573, 574, 455/575.1, 550.1, 41.1; 320/107, 123

(56) References Cited

U.S. PATENT DOCUMENTS

| | | | |
|---|---|---|---|
| 3,696,251 A | 10/1972 | Last et al. | |
| 4,114,305 A | 9/1978 | Wohlert et al. | |
| 4,114,932 A | 9/1978 | Freeberg | |
| 4,709,176 A | 11/1987 | Ridley et al. | |
| 5,347,186 A | 9/1994 | Konotchick | |
| 5,889,383 A * | 3/1999 | Teich | 455/573 |
| 5,975,714 A | 11/1999 | Vetorino et al. | |
| 6,172,426 B1 | 1/2001 | Galich | |
| 6,316,909 B1 * | 11/2001 | Honda et al. | 320/108 |
| 6,681,121 B1 * | 1/2004 | Preston et al. | 455/550.1 |
| 6,721,540 B1 * | 4/2004 | Hayakawa | 455/41.1 |
| 6,816,740 B2 * | 11/2004 | Lin | 455/573 |
| 2002/0142812 A1 * | 10/2002 | Goodman | 455/575 |
| 2004/0061066 A1 * | 4/2004 | Harada et al. | 250/396 ML |

* cited by examiner

*Primary Examiner*—Edward F. Urban
*Assistant Examiner*—Lana Le
(74) *Attorney, Agent, or Firm*—Bacon & Thomas, PLLC

(57) ABSTRACT

A self-rechargeable telephone having includes a power generation device capable of converting mechanical energy into electric energy and storing the electric energy in a battery cell. The direct-current voltage generated by the power generation device is obtained by reciprocally moving the magnetic body inside the coil winding to induce electric energy in the coil, and by then rectifying the electric energy.

4 Claims, 6 Drawing Sheets

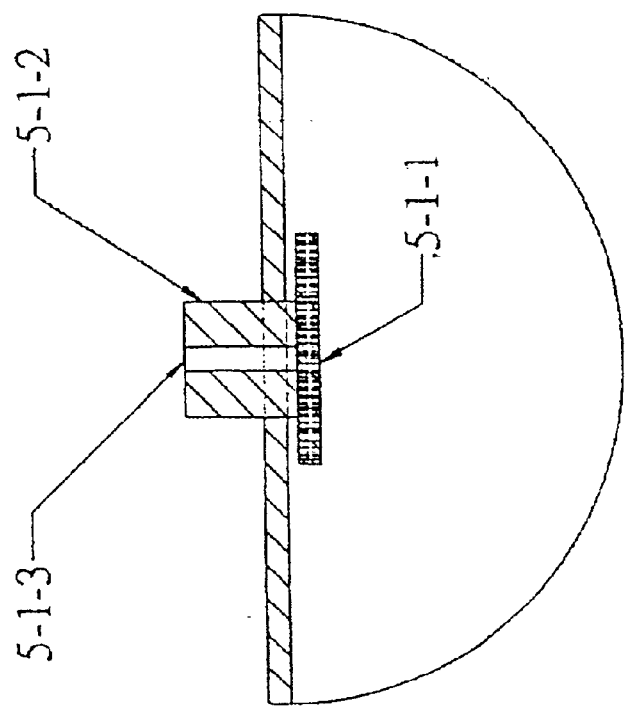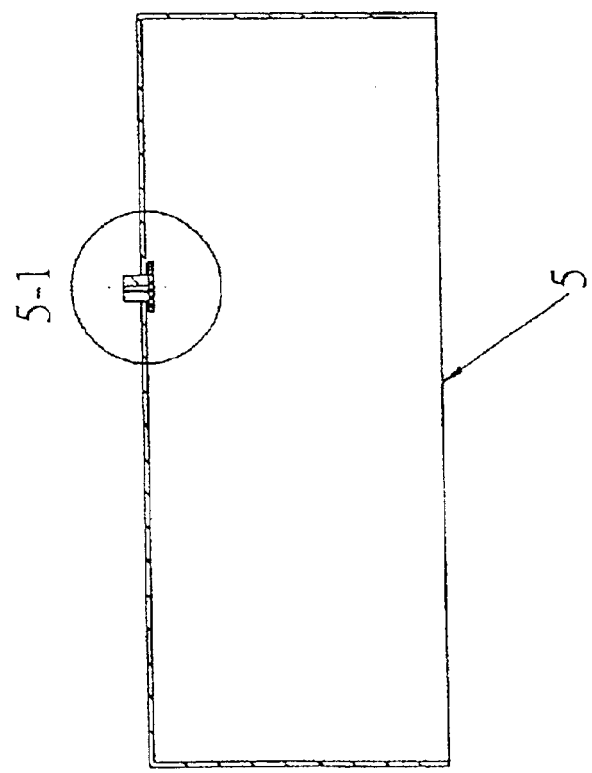
Fig. 5

SELF-RECHARGEABLE PORTABLE TELEPHONE

BACKGROUND OF THE INVENTION

1. Field of the Invention

The invention relates to a self-rechargeable portable telephone, and-more particularly to a self-rechargeable portable telephone/handset having a power generation device capable of converting mechanical energy resulting from movement of the telephone into electric energy and storing the electric energy in a battery cell.

2. Description of the Related Art

Typically, the portable telephone used for wire communication and wireless communication conventionally employs a primary cell or secondary cell. The primary cell is typically a non-rechargeable, disposal cell and the secondary cell is typically a rechargeable cell such as an Ni—H cell, Li cell, or electrolytic cell, etc.

However, all of the above cells need to be replaced or recharged and cause inconvenience in use. Therefore, it is necessary to develop a self-rechargeable telephone which does not require replacement of batteries or recharging.

SUMMARY OF THE INVENTION

Therefore, an object of the invention is to provide a self-rechargeable portable telephone having a power generation device capable of converting mechanical energy resulting from movement of the telephone into electric energy and storing the electric energy in a battery cell.

In order to achieve the above object, according to an aspect of the invention, there is provided a self-rechargeable portable telephone, comprising:

A portable telephone body, for receiving and transmitting data signals; and a power generation device, having a magnetic body and a coil winding, for generating direct-current (D.C.) voltage in response to movement of the telephone.

A rechargeable cell, capable of recharge by using the D.C. voltage, and at least one overload protection control device for protection of the portable telephone body and the rechargeable cell, wherein the D.C. voltage generated by the power generation device is obtained by causing reciprocal movement the magnetic body inside the coil winding for inducing electric energy in the coil winding, and by rectifying the induced electric current.

Other aspects and advantages of the present invention will become apparent from the following detailed description, taken in conjunction with the accompanying drawings, illustrating by way of example of the principles of the invention.

BRIEF DESCRIPTION OF THE DRAWINGS

The invention will present in detail the following description of a preferred exemplary example with reference to the following drawings, wherein:

FIGS. 3 to 5 are exploded schematic drawings showing a partial structure of FIG. 1 respectively;

DETAILED DESCRIPTION OF THE INVENTION

Figure 1:
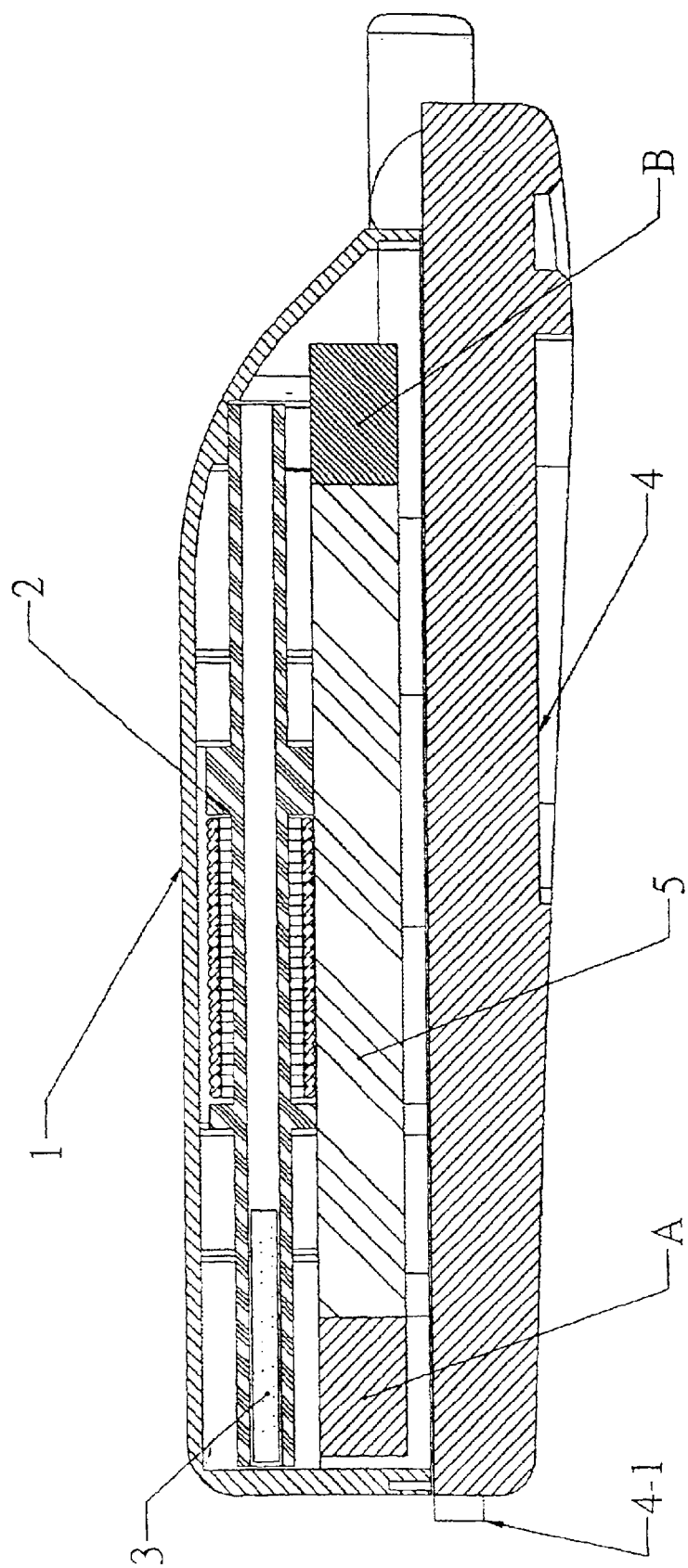
FIG. 1 is a section view showing a structure of a self-rechargeable portable telephone in accordance with a preferred embodiment of the invention.

FIG. 1 is a section view showing a structure of a self-rechargeable portable telephone according to an embodiment of the invention. The self-rechargeable portable telephone of the invention comprises a portable telephone body 4, a power generation device 2, a rechargeable cell 5, a coil 2, a magnetic body 3, an overload protection control device A, and an overload protection control device B, arranged in a case 1 of the cell 5. Overload protection control device A includes rectifier circuitry.

Figure 2:
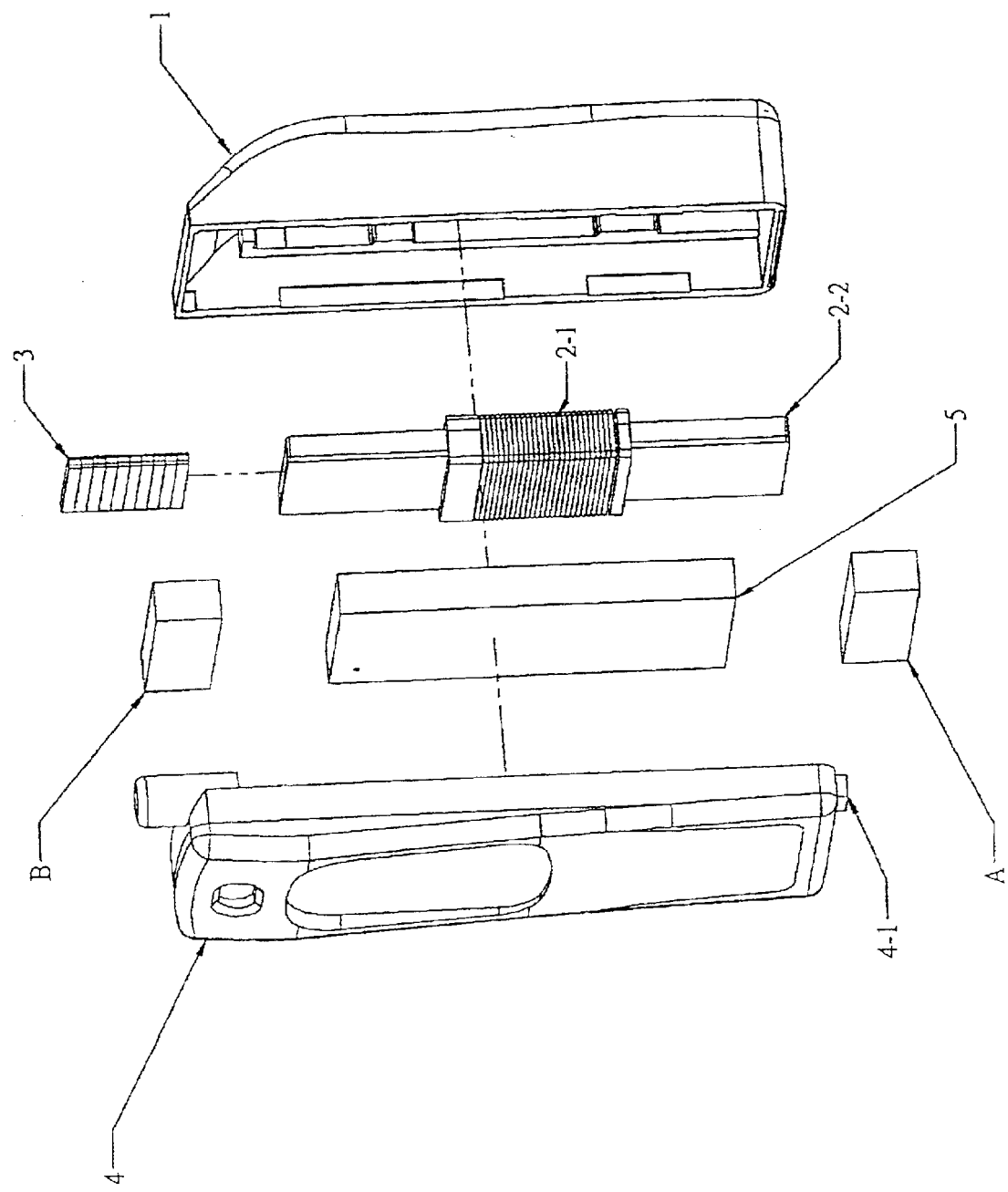
FIG. 2 is an exploded schematic drawing showing an overall structure of FIG. 1.

FIG. 2 is an exploded schematic drawing showing an overall structure of FIG. 1. As shown on FIG. 2, the portable telephone body 4 includes circuitry for receiving and transmitting data signals such as sound. Preferably, the portable telephone body is provided with a socket plug 4-1 for externally connecting to a power supply. The power generation device 2 has a magnetic body 3 and a coil winding. The coil winding includes at least one coil 2-1 which is wound on a support 2-2. According to Faraday's Law and the Lenz's Law, the coil winding may generate a direct current (D.C.) voltage by reciprocally moving the magnetic body 3 inside the support 2-2 to induce an alternative-current (A.C.) voltage, and by rectifying the alternative-current (A.C.) voltage. The magnetic body 3 includes a permanent magnetic material. The coil 2-1 may include either a permeable material or an air core, or a combination of a permineable material and air core.

The power generation device may include force accelerating elements such as resilient elements, in the form of springs or rubber elements, magnetic materials or systems, or a machine, device or system for applying a rebounding or repulsive force.

Figure 3:
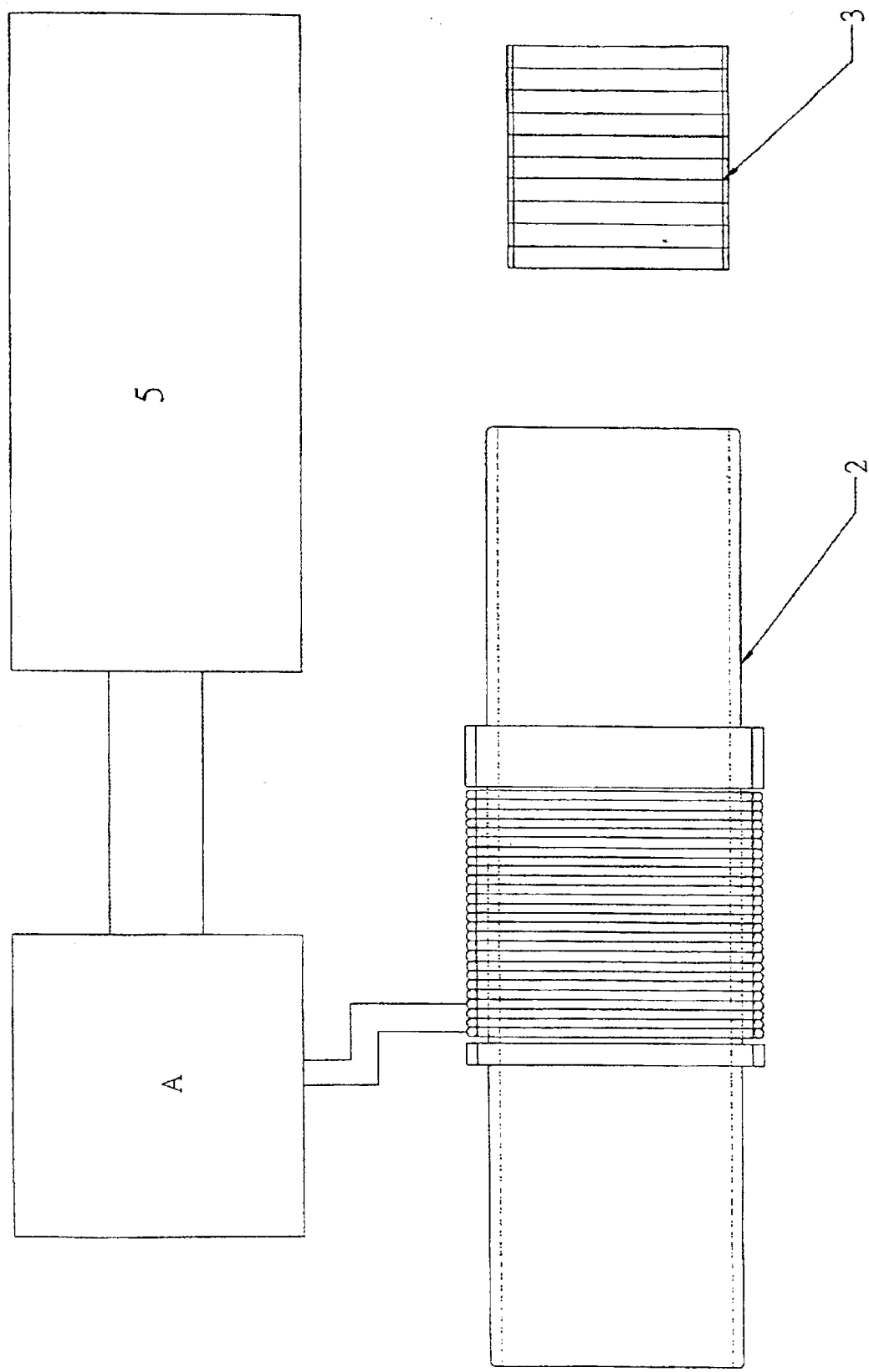
Figure 4:
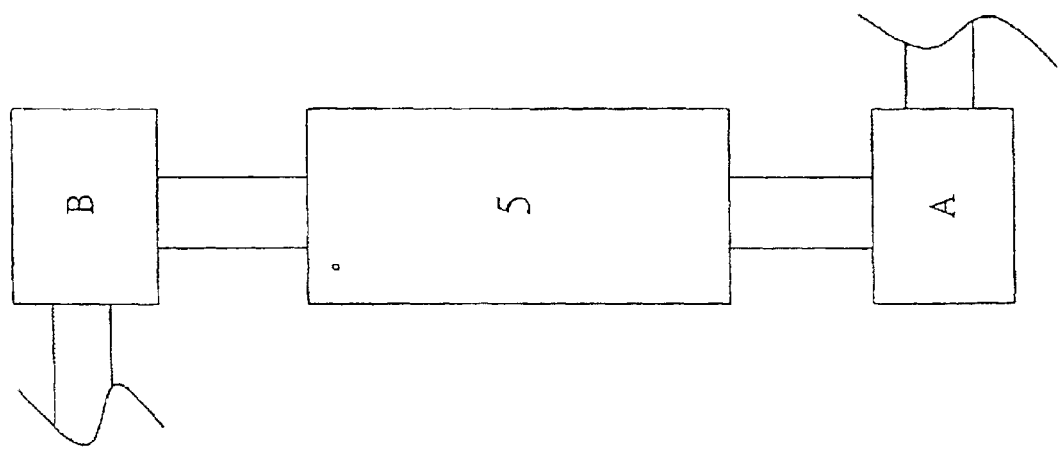

The generated D.C. voltage is supplied to the cell 5 (FIG. 1) via an overload protection control device/rectifier A, as shown in FIGS. 3 and 4.

As shown in FIG. 4, the cell 5 can supply the stored D.C. voltage to the portable telephone body 4 through the overload protection device B such that telephone circuitry in the portable telephone body 4 may be operated.

As showing in FIG. 5, the cell 5 is provided with a ventilation regulator 5-1 that has an air/liquid separator 5-1-1, plug 5-1-2 and a ventilation hole 5-1-3, for preventing the liquid in cell 5 from leaking and for allowing the air to be ventilated freely. However, the invention is not limited to a particular type of cell and may use any kind of rechargeable cell such as a secondary cell.

Figure 6:
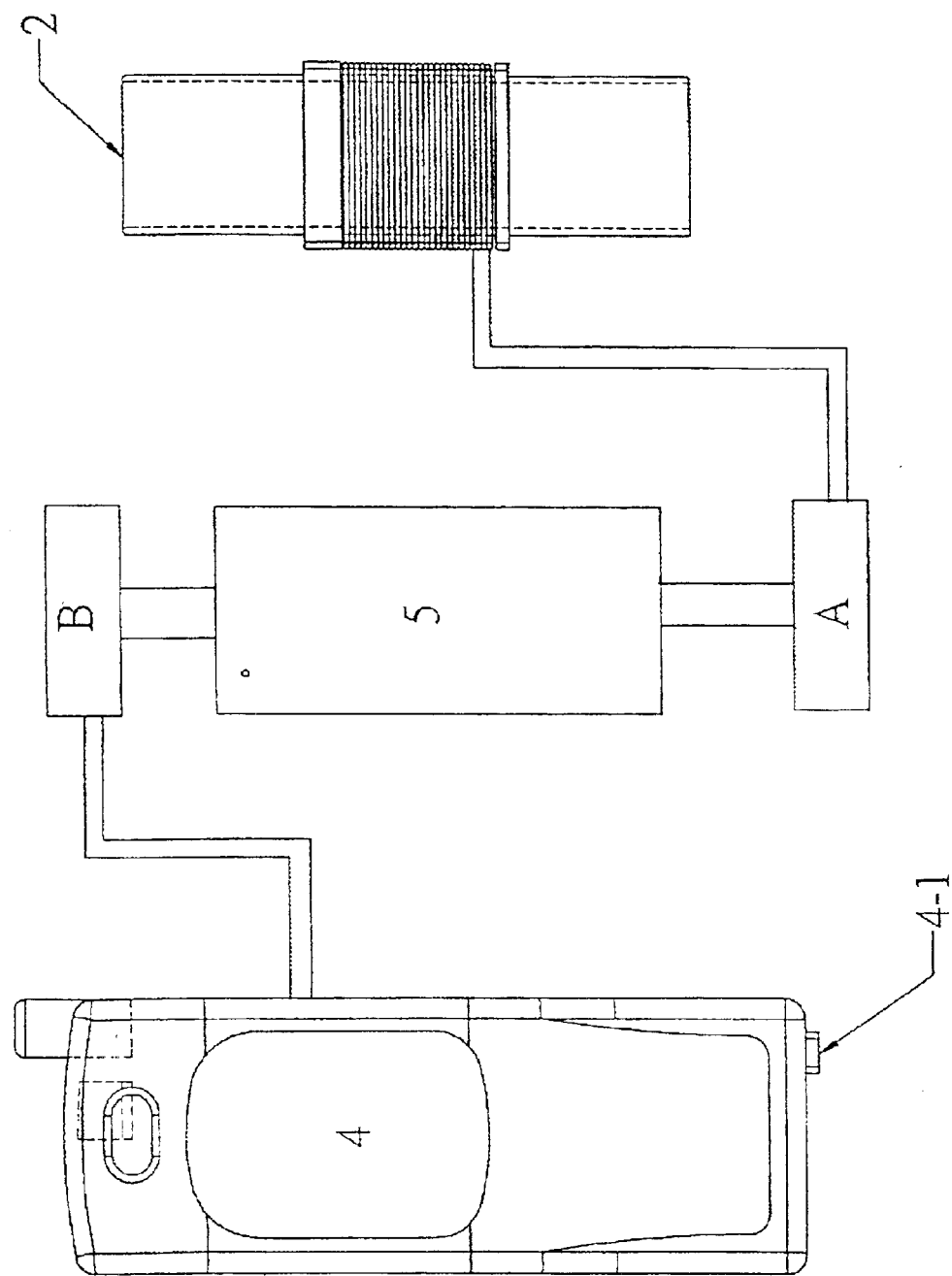
FIG. 6 is a schematic drawing showing a wiring structure of FIG. 1.

FIG. 6 shows a wiring structure of FIG. 1 in detail. A description of each portion has been illustrated above and will thus be omitted here.

Optionally, a connector may be provided to permit recharging of the battery through an external power source such as a recharger, in addition to the self-recharging described above. In that cases overload protection device B may include a rectifier to permit it to be used for charging.

To maximize generating efficiency, a plurality of generators aligned along different axes may be included in the telephone body. For example, three generators aligned along mutually perpendicular x,y and z axes may be provided.

Having described the preferred exemplary example of the invention, however, the illustrated example is not intended to be the limit of the invention. It is noted that modifications and variations can be made by persons skilled in the art in light of the above teachings. It is therefore to be understood that various changes, equivalences and modifications may be made to the particular example of the invention without departing from the scope and spirit of the invention as outlined by the appended claims.

| LIST OF REFERENCE NUMERALS | |
|---|---|
| 1 | Case of Cell |
| 2 | Power Generator Device |
| 2-1 | Coil Winding |
| 2-2 | Wound Body |
| 3 | Magnetic Body |
| 4 | Portable Telephone Body |
| 4-1 | Socket Plug |
| 5 | Rechargeable Cell |
| 5-1 | Ventilation Regulator |
| 5-1-1 | Air/Liquid Separator |
| 5-1-2 | Plug |
| 5-1-3 | Ventilation Hole |
| A, B | Overload Protection Control Device |

What is claimed is:

1. A self-rechargeable portable telephone, comprising:

a portable telephone body, including circuitry for receiving and transmitting data signals;

a power generation device, having a magnetic body and a coil winding, for generating direct-current (D.C.) voltage upon movement of the telephone;

a rechargeable cell, capable of recharge by using said direct-current (D.C.) voltage; and at least one overload protection control/rectifier device, for protection of the portable telephone body and the rechargeable cell, wherein said D.C. voltage generated by the power generation device is obtained by causing reciprocal movement of the magnetic body inside the coil winding upon movement of the telephone to induce electric current in the coil winding and rectifying of the electric current.

2. The self-rechargeable portable telephone according to claim 1, wherein said magnetic body includes a permanent magnetic material.

3. The self-rechargeable portable telephone according to claim 1, wherein said generator includes a coil, and said coil contains a permeable material or air core.

4. The self-rechargeable portable telephone according to claim 1, wherein said rechargeable cell is a secondary cell.

* * * * *